(No Model.) 2 Sheets—Sheet 1.

H. BERTRAM.
MACHINE FOR DIVIDING DOUGH.

No. 507,063. Patented Oct. 17, 1893.

Witnesses:
J. A. Rutherford
H. A. Shepherd

Inventor:
Herman Bertram
By James L. Norris.
Attorney (No Model.) 2 Sheets—Sheet 2.
H. BERTRAM.
MACHINE FOR DIVIDING DOUGH.
No. 507,063. Patented Oct. 17, 1893.
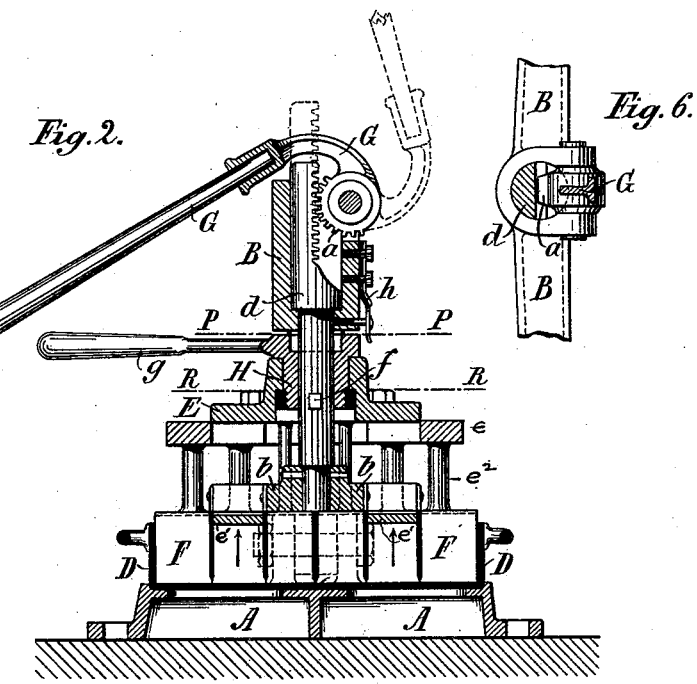
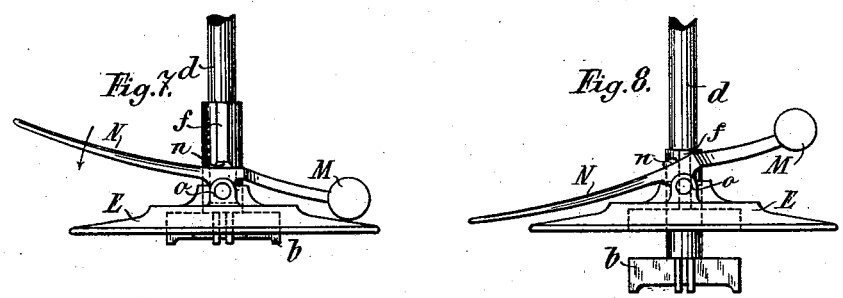
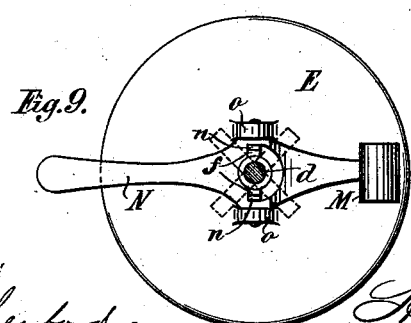
Witnesses:
J. A. Rutherford
H. A. Shepherd
Inventor:
Herman Bertram
By James L. Norris
Attorney

UNITED STATES PATENT OFFICE.

HERMAN BERTRAM, OF HALLE-ON-THE-SAALE, GERMANY.

MACHINE FOR DIVIDING DOUGH.

SPECIFICATION forming part of Letters Patent No. 507,063, dated October 17, 1893.

Application filed June 1, 1892. Serial No. 435,149. (No model.) Patented in Germany January 21, 1887, No. 40,569, and March 22, 1891, No. 59,607.

*To all whom it may concern:*

Be it known that I, HERMAN BERTRAM, engineer, a subject of the King of Prussia, and a resident of Halle-on-the-Saale, in the Empire of Germany, have invented certain new and useful Improvements in Machines for Dividing Dough, (for which I have obtained patents in Germany, No. 40,569, dated January 21, 1887, and No. 59,607, dated March 22, 1891,) of which the following is a specification, reference being had to the accompanying drawings.

This invention has for its object to provide a new and improved machine for dividing dough for bread, cakes, and the like; and to accomplish this object the invention consists in the features of construction and the combination or arrangement of devices hereinafter described and claimed, reference being made to the accompanying drawings, in which—

Figure 1:
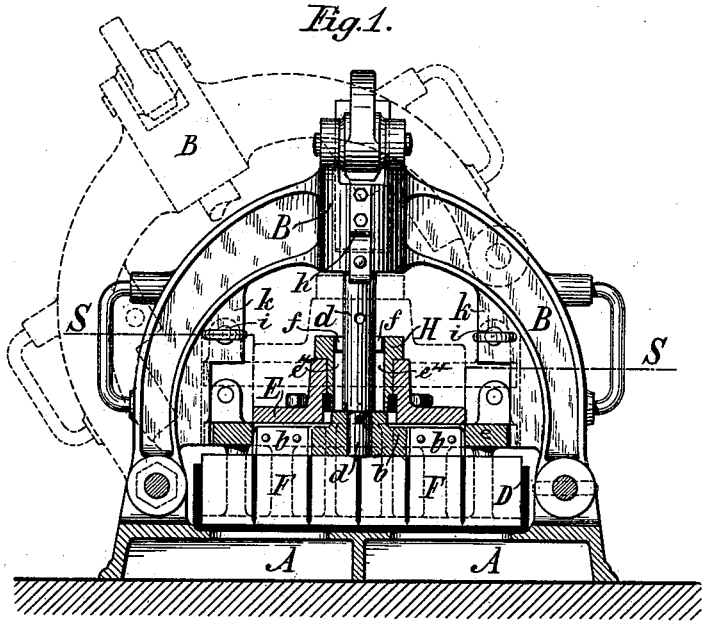
Figure 4:
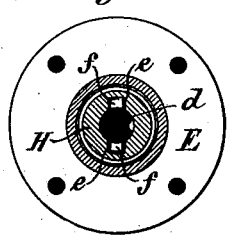
Figure 5:
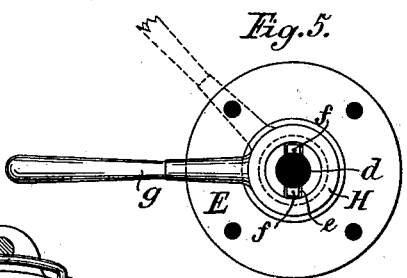
Figure 3:
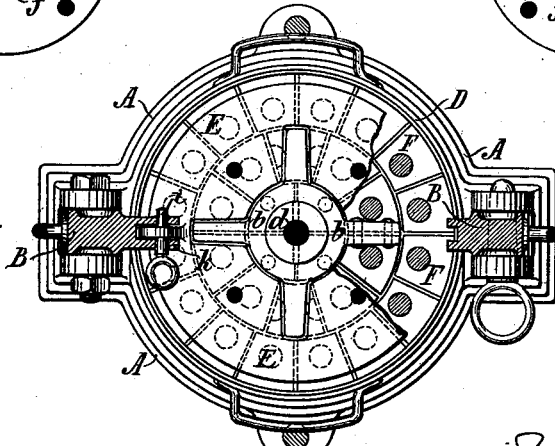

Figure 1 is an elevation of the machine partly in section through the knife disk, pressing disk and the parts appertaining thereto, and also through the bed plate of the machine. Fig. 2 is a vertical section through the machine, this section being taken on a plane which is at a right angle to the sectional plane in Fig. 1. Fig. 3 is a horizontal section on the line S S in Fig. 1. Fig. 4 is a top view of the pressing disk with the coupling device in horizontal section. Fig. 5 is another top view of the pressing disk with the coupling device. Fig. 6 represents the toothed pressing lever. Figs. 7 and 8 represent the modified coupling device in two different positions. Fig. 9 is a top view of the modified coupling device.

I arrange upon the bed plate A the bow shaped frame B which is adapted to be lifted at one end. Between the arms of the bow-shaped frame is placed a removable receptacle D which serves for the reception of the dough and into which the pressing disk E and the cutting mechanism F are introduced. Before the dough is pressed it is in an irregular mass or lump that must be pressed to a uniform thickness to facilitate its division into pieces suitable for cakes or biscuits. The movement of the pressing disk is effected by means of a lever G provided with a toothed segment or a wheel $a$. The knife disk $b$ has a rod $d$ formed at its upper part with teeth engaging with the segment or wheel $a$. By pressing down the lever G the knife disk $b$ and the pressing disk E are simultaneously moved downward the dough being thus pressed but not yet divided or cut, the cutting mechanism being at this time in a retracted position within the pressing disk. When this has been accomplished and the pressed dough is to be cut the following mechanism is set in action. I provide on the pressing disk a rotatable bush or sleeve H which is provided with grooves $e^4$, and in which the rod $d$ of the knife disk $b$ is guided, the said rod carrying pins $f$. The grooves $e^4$ in the sleeve H can be placed in such a position, by turning the bush or sleeve through the medium of the lever $g$, that the pins $f$ in the simultaneous downward movement of the knife disk $b$ and the pressing disk E will bear upon the edge of the bush or sleeve H provided on the said pressing disk, thereby carrying with it this bush or sleeve. When the dough is pressed to uniform thickness, that is to say when the pressing disk is to stop and the knife F is to move downward alone, the bush or sleeve H is turned in such a manner that the pins $f$ on the rod $d$ of the knife disk can slide freely downward in the grooves $e^4$. On the completion of the cut the lever G is moved backward and held in its uppermost position by the action of the stop spring $h$ upon the rod $d$, Fig. 2. Accordingly the knife disk and also the pressing disk are kept above so that the divided dough is left free and the receptacle D for the dough can be removed from the bed plate A.

The cutting mechanism F comprises several concentric series of knives arranged as shown in Fig. 3 to accord with the number of pieces into which the dough is to be divided. As shown in Fig. 2 the pressing disk E is composed of an upper plate $e$ and a lower plate $e'$ that are connected by pillars $e^2$, the upper plate $e$ being recessed in its upper side to receive the knife head or support when the pressing disk and cutting disk are coupled together and the plate $e'$ being provided with slots through which the knives can descend when said disks are uncoupled.

For rapid work, use may be made of several receptacles for the dough, one of which contains the dough to be divided and another the divided pieces of dough.

To conveniently clean the knives the pressing disk is moved to the highest position (shown in dotted lines Fig. 1) and held by means of pins $i$ to the lugs $k$, while by lifting the bow-shaped frame B at one end the knives are left quite free.

In the above-described arrangement the connection of the pressing disk E with the knife disk $b$ is established or disestablished by turning a bush or sleeve H. I may also disestablish the connection by simple pressure upon the auxiliary lever, while the connection may be established automatically.

Figs. 7 to 9 represent only the main parts of the modified arrangement used for this purpose all the auxiliary parts being omitted. The knife disk $b$ is connected with the rod $d$ and the latter with the lever G and toothed segment $a$ in the same manner as shown in Figs. 1 to 6. The projections $f$ on the rod $d$ are guided in grooves, which however are formed, not in the bush or sleeve, but directly in the pressing disk E. These projections $f$ enter the grooves in the pressing disk E only after the knife disk has performed a certain portion of the downward movement. In the initial position (Fig. 7) wherein the knife disk $b$ and pressing disk E are still coupled, the projections $f$ do not therefore extend into the grooves, but leave an intermediate space which is filled up by a tappet $n$ on each side so that in the initial position (Fig. 7) the knife disk $b$ cannot move down without carrying with it the pressing disk E. The two tappets are provided upon the upper surface of a hand lever N embracing the rod $d$ and having its fulcrum at $o$ in small blocks cast on the pressing disk E. The lever N is provided on its rear end with a weight M so that it will always tend to move to the initial position (Fig. 7).

When by the employment of the machine the dough has been sufficiently pressed, to bring it to a uniform thickness, the knife disk and pressing disk having moved downward together, after which the pressing disk is to stop while the knife disk is to move downward alone, the lever N is pressed down to the position indicated in Fig. 8, whereby the tappets $n$ liberate the projections $f$ so that the knife disk can now be pressed downward without hinderance. After the completion of the cut the lever G is moved backward. The knife disk therefore moves upward and carries away the pressing disk when the relative position of the same, as indicated in Fig. 7, is attained. At this movement the lever N falls back to its original position and the coupling of the two disks for the downward movement takes place automatically.

What I claim is—

In a machine for pressing and dividing dough, the combination of the vertically movable pressing disk E, the knife disk $b$ having a vertical rod $d$ provided with pins or projections $f$ for coupling with the pressing disk, and the weighted lever N having tappets $n$ adapted to engage the projections $f$ and control the coupling of the pressing disk and cutting disk, substantially as described.

In testimony whereof I have hereunto signed my name in the presence of two subscribing witnesses.

HERMAN BERTRAM.

Witnesses:
CARL BORNGRAEBER,
FELIX BOEHM.